(12) United States Patent
Saka et al.

(10) Patent No.: US 8,670,158 B2
(45) Date of Patent: Mar. 11, 2014

(54) IMAGE PROCESSING APPARATUS AND METHOD FOR REDUCING GRADATION LEVEL OF IMAGE

(75) Inventors: Masaaki Saka, Toyohashi (JP); Tomohiro Yamaguchi, Shinshiro (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 252 days.

(21) Appl. No.: 13/183,042

(22) Filed: Jul. 14, 2011

(65) Prior Publication Data

US 2012/0013950 A1    Jan. 19, 2012

(30) Foreign Application Priority Data

Jul. 16, 2010    (JP) ................................ 2010-161246

(51) Int. Cl.
*G06K 15/00*    (2006.01)
(52) U.S. Cl.
USPC ......................................... 358/3.22; 358/3.1
(58) Field of Classification Search
USPC ........ 358/3.03, 3.1, 3.13, 3.14; 382/277, 298, 382/299
See application file for complete search history.

(56) References Cited

U.S. PATENT DOCUMENTS

| 6,101,286 A | 8/2000 | Shimizu et al. |
| 2009/0225370 A1 | 9/2009 | Gotoh et al. |

FOREIGN PATENT DOCUMENTS

| CN | 101527775 | 9/2009 | |
| JP | 07-274004 | 10/1995 | |
| JP | 09-74493 | 3/1997 | |
| JP | 10-32712 | 2/1998 | |
| JP | 10-336454 | 12/1998 | |
| JP | 2002-247356 | 8/2002 | |
| JP | 2004-64189 | 2/2004 | |
| JP | 2004-260700 | 9/2004 | |
| JP | 4107108 | 9/2004 | |
| JP | 2004-287794 | 10/2004 | |
| JP | 2004-297667 | 10/2004 | |
| JP | 2008-087382 | * 4/2008 | ............... B41J 2/205 |
| JP | 2008-87382 | 4/2008 | |

OTHER PUBLICATIONS

Notification of Reason(s) for Refusal mailed Mar. 6, 2012, directed to Japanese Patent Application No. 2010-161246; 5 pages.
Office Action dated Sep. 3, 2013, directed to CN Application No. 201110196353.X; 10 pages.

* cited by examiner

*Primary Examiner* — Barbara Reinier
(74) *Attorney, Agent, or Firm* — Morrison & Foerster LLP

(57) ABSTRACT

An image processing apparatus includes a first generation portion that generates a first low-gradation image by performing a first process on an input image to reduce the number of gradations of the input image, a second generation portion that generates a second low-gradation image by performing a second process on the input image to reduce the number of gradations of the input image, a density detector that detects a density of the input image, a determination portion that determines, based on the density, a ratio at which the first low-gradation image and the second low-gradation image are blended together, and a mixing portion that blends the first low-gradation image and the second low-gradation image in accordance with the ratio.

10 Claims, 13 Drawing Sheets

SCREEN OUTPUT IMAGE

+

ERROR DIFFUSION OUTPUT IMAGE

=

COMPOSITE IMAGE MIXTURE RATIO
(ERROR DIFFUSION 50%: SCREEN 50%)

IMAGE PROCESSING APPARATUS AND METHOD FOR REDUCING GRADATION LEVEL OF IMAGE

This application is based on Japanese patent application No. 2010-161246 filed on Jul. 16, 2010, the contents of which are hereby incorporated by reference.

BACKGROUND OF THE INVENTION

1. Field of the Invention

The present invention relates to an apparatus and method for reducing the gradation level of an image by using a plurality of methods.

2. Description of the Related Art

There are proposed a variety of methods as a method for reducing the number of gradations of an image to reproduce an image. For example, error diffusion processing is disclosed in Japanese Laid-open Patent Publication No. 10-032712.

There is also proposed another method for reproducing an image with screen processing. With the method, screens are prepared in advance, and an image is reproduced by using a screen depending on the density thereof.

Reproducing an image with error diffusion processing results in greater sharpness than when an image is reproduced with screen processing, although graininess increases.

In view of this, a method is possible in which a part of the entire image is reproduced with error diffusion processing and the other part is reproduced with screen processing. A technique to selectively use a plurality of methods for reducing the gradation level of an image is disclosed in Japanese Laid-open Patent Publication Nos. 10-032712, 2004-064189, 7-274004, 9-074493, 10-336454, 2002-247356, and 2004-287794.

Unfortunately, the selective use of reproduction methods makes discontinuity of images noticeable, for example, around the boundary between a part of the image reproduced with error diffusion processing and a part of the image reproduced with screen processing. In short, an unnatural connection appears around the boundary therebetween.

SUMMARY

The present disclosure is directed to solve the problems pointed out above, and therefore, an object of an embodiment of the present invention is to enable a reproduced image to appear more natural than is conventionally possible, even if a plurality of methods are used to reduce the gradation level of an image.

According to an aspect of the present invention, an image processing apparatus includes a first generation portion that generates a first low-gradation image by performing a first process on an input image to reduce the number of gradations of the input image, a second generation portion that generates a second low-gradation image by performing a second process on the input image to reduce the number of gradations of the input image, a density detector that detects a density of the input image, a determination portion that determines, based on the density, a ratio at which the first low-gradation image and the second low-gradation image are blended together, and a mixing portion that blends the first low-gradation image and the second low-gradation image in accordance with the ratio.

Preferably, the first generation portion generates the first low-gradation image by performing screen processing as the first process, the second generation portion generates the second low-gradation image by performing error diffusion processing as the second process, and the determination portion determines the ratio in such a manner that the higher the density is, the higher the ratio becomes.

The image processing apparatus may include a line-appearance-frequency detector that detects a frequency indicating how often a line constituted by a plurality of dots continuously disposed appears, or, indicating how often a line constituted by a plurality of dots regularly and intermittently disposed appears. The determination portion may determine the ratio in such a manner that the higher the frequency is, the higher the ratio becomes.

The second generation portion may perform the error diffusion processing by adding a screen noise to a predetermined region in the input image in accordance with the ratio. The screen noise may have a pattern close to a pattern of a first screen that is used in the screen processing performed on the predetermined region by the first generation portion.

The density detector may detect, as the density, for each pixel of the input image, any one of the following: an average value of densities of pixels in a prescribed range centered on said each pixel; a minimum value of the densities of the pixels in the prescribed range; and a content of a black image obtained by performing binarization process on the pixels in the prescribed range. The determination portion may determine the ratio for said each pixel of the input image. The mixing portion may blend the first low-gradation image and the second low-gradation image in accordance with the ratio of said each pixel of the input image.

The density detector may detect, as the density, any one of the average value and the minimum value in accordance with attributes of the input image.

These and other characteristics and objects of the present invention will become more apparent by the following descriptions of preferred embodiments with reference to drawings.

DESCRIPTION OF THE PREFERRED EMBODIMENTS

First Embodiment

Figure 1:
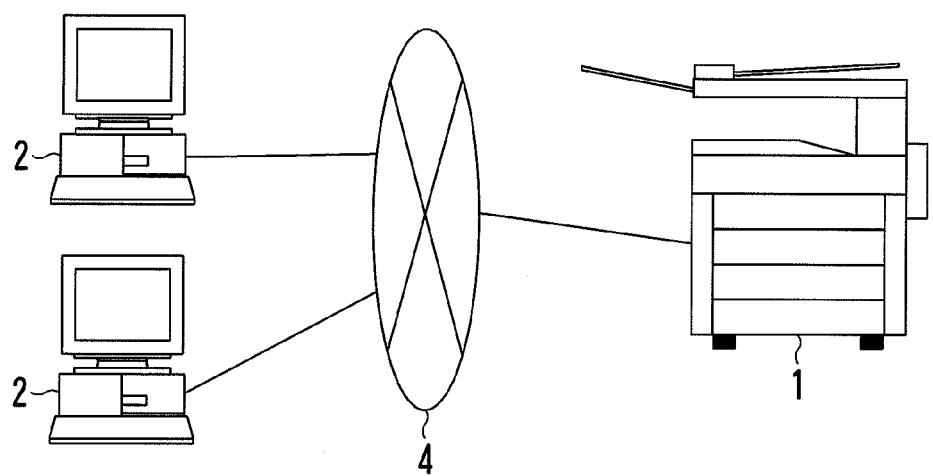
FIG. 1 shows an example of the configuration of a network system having an image forming apparatus.
Figure 2:
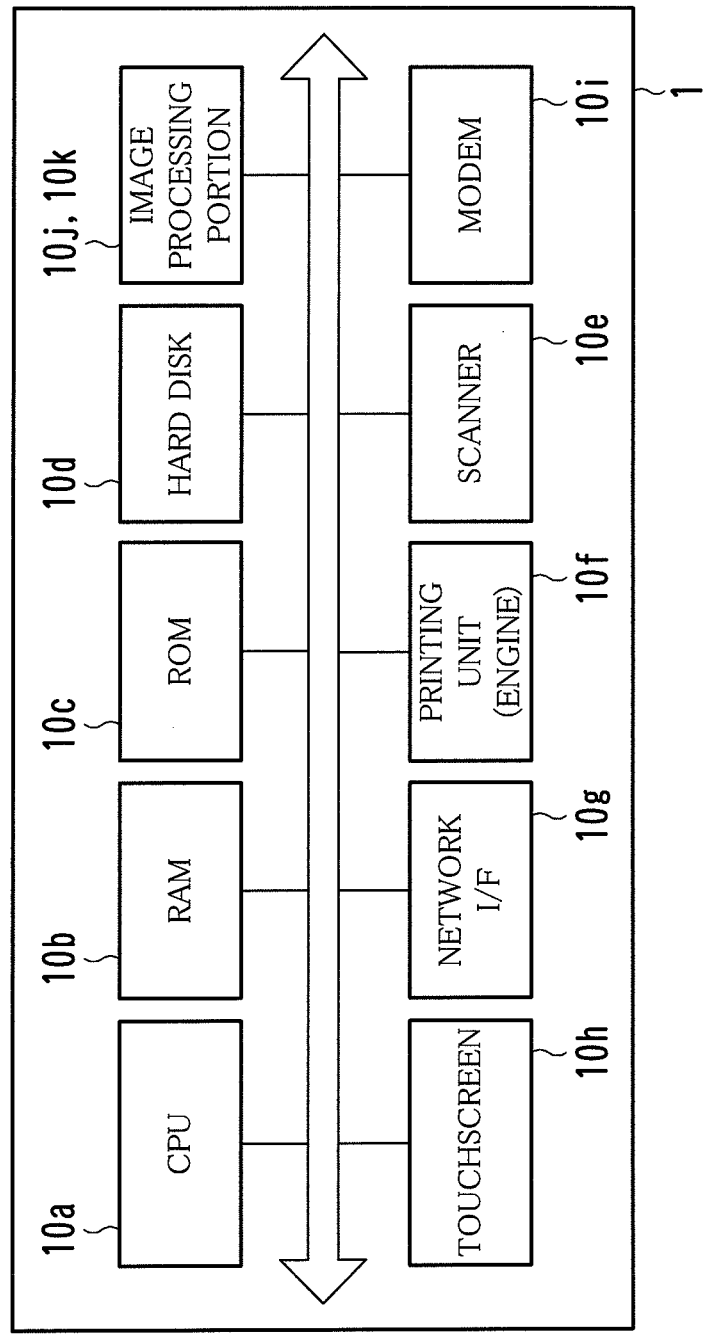
FIG. 2 shows an example of the configuration of an image forming apparatus.
Figure 3:
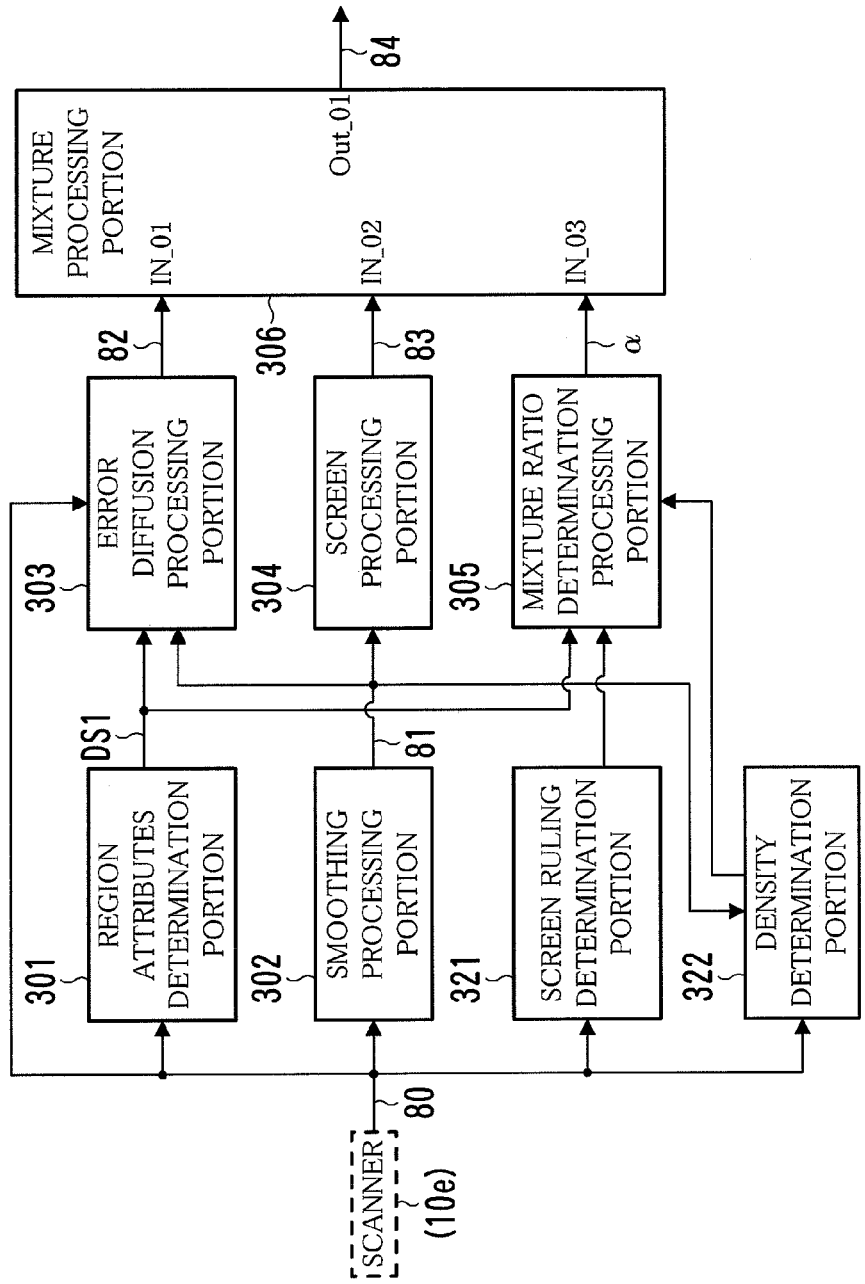
FIG. 3 shows an example of the configuration of an image processing portion.
Figure 4:
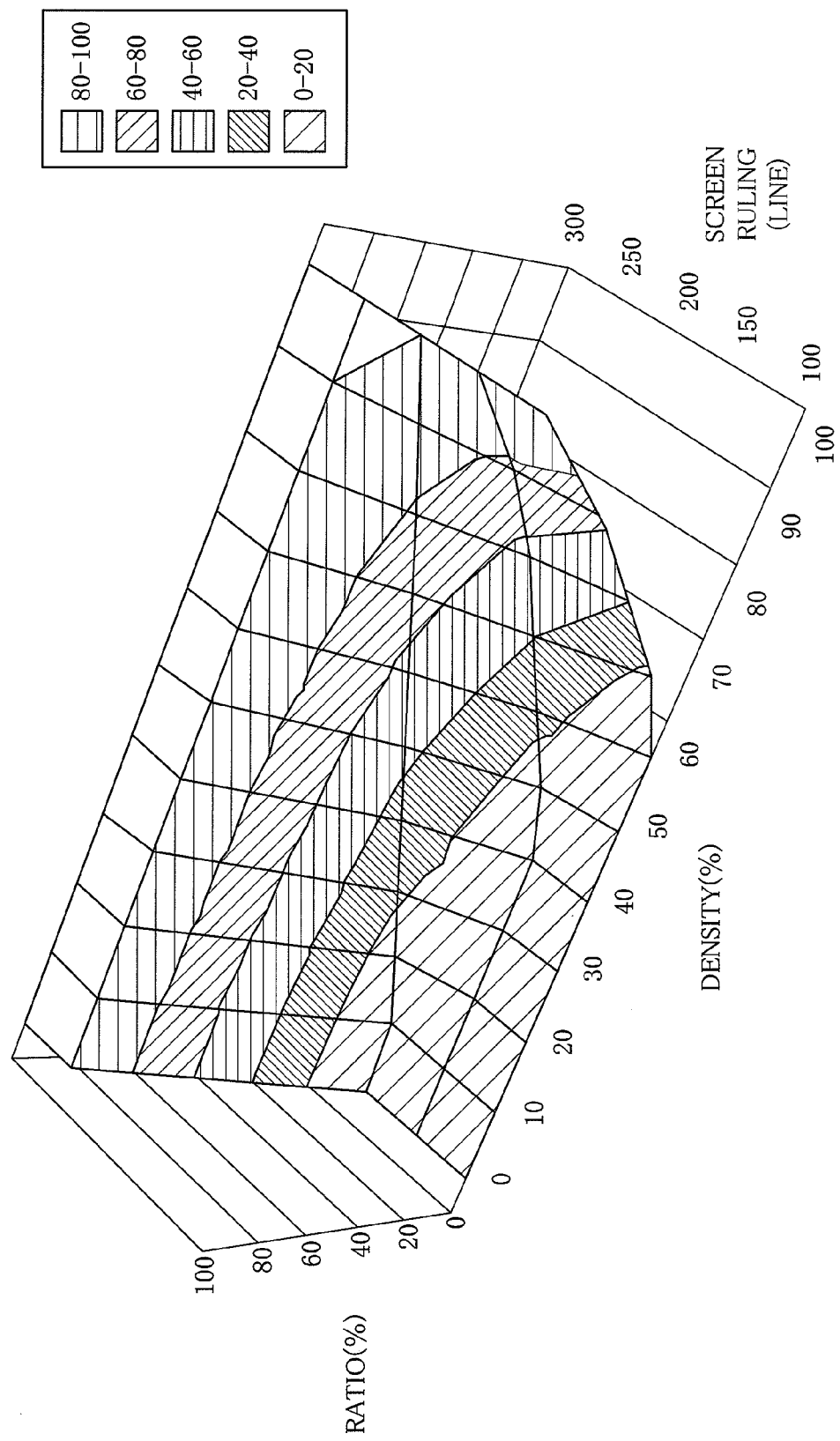
FIG. 4 shows an example of the relationship between densities, the number of lines of dots per inch (screen ruling), and screen ratios.

FIG. 1 shows an example of the configuration of a network system having an image forming apparatus 1; FIG. 2 shows an example of the configuration of the image forming apparatus 1; FIG. 3 shows an example of the configuration of an image processing portion 10j; and FIG. 4 shows an example of the relationship between densities, the number of lines of dots per inch (screen ruling), and screen ratios.

The image forming apparatus 1 shown in FIG. 1 is an image processing apparatus typically called a Multi-functional Peripheral (MFP) or the like, and consolidates, thereinto, functions such as copy, PC print (network printing), fax, and scan.

The image forming apparatus 1 is connectable to other devices such as a personal computer 2 via a communication line 4.

Referring to FIG. 2, the image forming apparatus 1 is configured of a Central Processing Unit (CPU) 10a, a Random Access Memory (RAM) 10b, a Read Only Memory (ROM) 10c, a hard disk 10d, a scanner 10e, a printing unit 10f, a network interface 10g, a touchscreen 10h, a modem 10i, an image processing portion 10j, and the like.

The scanner 10e is a device that generates image data by reading an image depicted on paper constituted by a photograph, text, graphic, chart or the like.

The image processing portion 10j performs image processing on the image data of an image on the paper read by the scanner 10e or image data transmitted from the personal computer 2. This will be discussed later. Hereinafter, image data prior to undergoing the processing by the image processing portion 10j is referred to as "image data 80". Further, an image on an entire surface of the paper is referred to as a "page image".

The printing unit 10f prints an image onto paper based on image data that has been subjected to the image processing by the image processing portion 10j.

The touchscreen 10h displays a screen for providing a message to a user, a screen showing processing results, a screen for the user to input instructions given to the image forming apparatus 1, and the like. Also, the touchscreen 10h detects a position that has been touched (pressed), and notifies that position to the CPU 10a.

The network interface log is a Network Interface Card (NIC) for communicating with other devices using Transmission Control Protocol/Internet Protocol (TCP/IP) via a so-called Local Area Network (LAN) line or the like.

The modem 10i communicates with another fax terminal using the G3 protocol via a fixed telephone network.

Apart from an OS (Operating System), programs such as firmware and applications are stored in the ROM 10c or the hard disk 10d. These programs are loaded into the RAM 10b as necessary and executed by the CPU 10a.

Referring to FIG. 3, the image processing portion 10j is constituted by a region attributes determination portion 301, a smoothing processing portion 302, an error diffusion processing portion 303, a screen processing portion 304, a mixture ratio determination processing portion 305, a mixture processing portion 306, a screen ruling determination portion 321, a density determination portion 322, and the like.

The portions of the image processing portion 10j are implemented by circuits such as an Application Specific Integrated Circuit (ASIC) or a Field Programmable Gate Array (FPGA). Alternatively, some or all of the functions of the image processing portion 10j may be implemented by causing the CPU 10a to execute software.

The image processing circuit 10j uses such a configuration shown in FIG. 3 to perform a process for reducing the number of density gradations of pixels in a page image. For example, when the density of each pixel in a page image is represented by 8-bit values, i.e., 256 gradations, the image processing circuit 10j performs a process for reducing the number of density gradations to 4-bit values, i.e., 16 gradations. In order to perform such a process, error diffusion processing and screen processing are used in combination with each other. The following is a description of the individual portions of the image processing portion 10j shown in FIG. 3.

When the scanner 10e reads a page image depicted on paper to create image data 80 thereof, the region attributes determination portion 301 determines which attributes (type) region each pixel in the page image belongs to. In the first embodiment, the region attributes determination portion 301 determines whether each pixel in the page image belongs to a halftone dots region or a region other than the halftone dots region, i.e., a non-halftone dots region. The "halftone dots region" is a region in which a plurality of dots are disposed regularly. Hereinafter, data indicating the result of determination by the region attributes determination portion 301 is referred to as "region attributes data DS1".

The smoothing processing portion 302 performs smoothing processing on a group of pixels that have been determined to be in a halftone dots region of the page image by the region attributes determination portion 301. Hereinafter, image data 80 on the page image of which pixels have been subjected to the smoothing processing is referred to as "image data 81".

The error diffusion processing portion 303 performs error diffusion processing on image data 80. To be specific, the error diffusion processing portion 303 employs the error diffusion processing to reduce the number of density gradations in the page image indicated in the image data 80. Hereinafter, the image data 80 that has undergone the error diffusion processing is referred to as "error-diffused image data 82".

The screen processing portion 304 performs screen processing on image data 81. To be specific, the screen processing portion 304 performs a process for reducing the number of density gradations of the individual pixels of the page image indicated in the image data 81 and reproducing an image by using different screens composed of various shapes such as dots, lines, or mesh, depending on the density. Hereinafter, the image data 81 that has undergone the screen processing is referred to as "screen-processed image data 83".

In the first embodiment, known methods can be used to perform the error diffusion processing and the screen processing.

The mixture processing portion 306 performs a process for blending an error-diffused page image and a screen-processed page image. The mixture ratio determination processing portion 305 performs a process in cooperation with the screen ruling determination portion 321 and the density determination portion 322, and thereby, determines the mixture ratio of the error-diffused page image and the screen-processed page image. Descriptions are given below of a process for determining the mixture ratio.

The screen ruling determination portion 321 determines the number of lines of dots per inch for each section having a predetermined size. The screen ruling determination portion 321 detects as the number of lines of dots per inch, for example, how often a line constituted by dots continuously disposed appears, or, how often a line constituted by dots regularly and intermittently disposed appears.

The density determination portion 322 determines the density of each section having a predetermined size. The density is preferably determined, for example, using a method in which binarization processing is performed on the individual pixels of the section and the ratio of the number of black pixels to the number of white pixels, i.e., the ratio of the number of pixels having a value of "1" to the number of pixels having a value of "0", is calculated.

The mixture ratio determination processing portion 305 is provided with a mixture ratio table TLG showing the relationship between densities, the number of lines of dots per inch, and screen ratios as illustrated in FIG. 4. When a section having a predetermined size is a halftone dots region, the mixture ratio determination processing portion 305 reads out, from the mixture ratio table TLG, a screen ratio corresponding to the number of lines of dots per inch determined by the screen ruling determination portion 321 and the density determined by the density determination portion 322, and determines the screen ratio thus read out as the mixture ratio.

According to the mixture ratio table TLG, the higher the density is, the higher the screen ratio becomes. Also, the more the number of lines of dots per inch is, the higher the screen ratio becomes.

The mixture ratio determination processing portion 305 is also provided with a mixture ratio table TLH (not shown) for non-halftone dots region. When a section having a predetermined size is a non-halftone dots region such as a natural image region, the mixture ratio determination processing portion 305 reads out, from the mixture ratio table TLH, a screen ratio corresponding to the number of lines of dots per inch determined by the screen ruling determination portion 321 and the density determined by the density determination portion 322, and determines the screen ratio thus read out as the mixture ratio.

According to the mixture ratio table TLH, the screen ratio is higher than the case of using the mixture ratio table TLG, on the whole, i.e., independently of the density and the number of lines of dots per inch. The "screen ratio" means, for the case of blending a screen-processed page image and an error-diffused page image, the ratio of the former page image to both the page images. For example, if the screen ratio is "α %", then the former page image is blended by a % and the latter page image is blended by (100−α)%.

The mixture processing portion 306 performs a process for blending a screen-processed page image and an error-diffused page image based on the screen ratio (mixture ratio) determined by the mixture ratio determination processing portion 305. To be specific, the mixture processing portion 306 calculates the densities of the individual pixels in the page image by using the following equation (1) and creates mixture image data 84 indicating the densities of the individual pixels.

$$Q(x,y)=R(x,y)\times \alpha\%+S(x,y)\times(100-\alpha)\% \quad (1)$$

where Q(x, y) denotes the density of the pixel identified by the coordinates (x, y), R(x, y) denotes the density of the pixel identified by the coordinates (x, y) indicated in the screen-processed image data 83, S(x, y) denotes the density of the pixel identified by the coordinates (x, y) indicated in the error-diffused image data 82, and a represents the screen ratio (mixture ratio) determined by the mixture ratio determination processing portion 305.

In the case where a screen-processed page image and an error-diffused page image are different from each other in number of gradations, the mixture processing portion 306 adjusts the number of gradations of both the page images to be a higher number of gradations thereof, and then, performs the calculation of the equation (1). For example, when the density of one of the screen-processed page image and the error-diffused page image is represented by 2-bit values (i.e., 4 gradations) and the density of the other is represented by 4-bit values (i.e., 16 gradations), the former is adjusted to conform to the latter. To be specific, the lower density is quadrupled, and after that, the calculation is performed.

The mixture image data 84 created in this way is image data on a page image in which the number of gradations is reduced.

Second Embodiment

Figure 5:
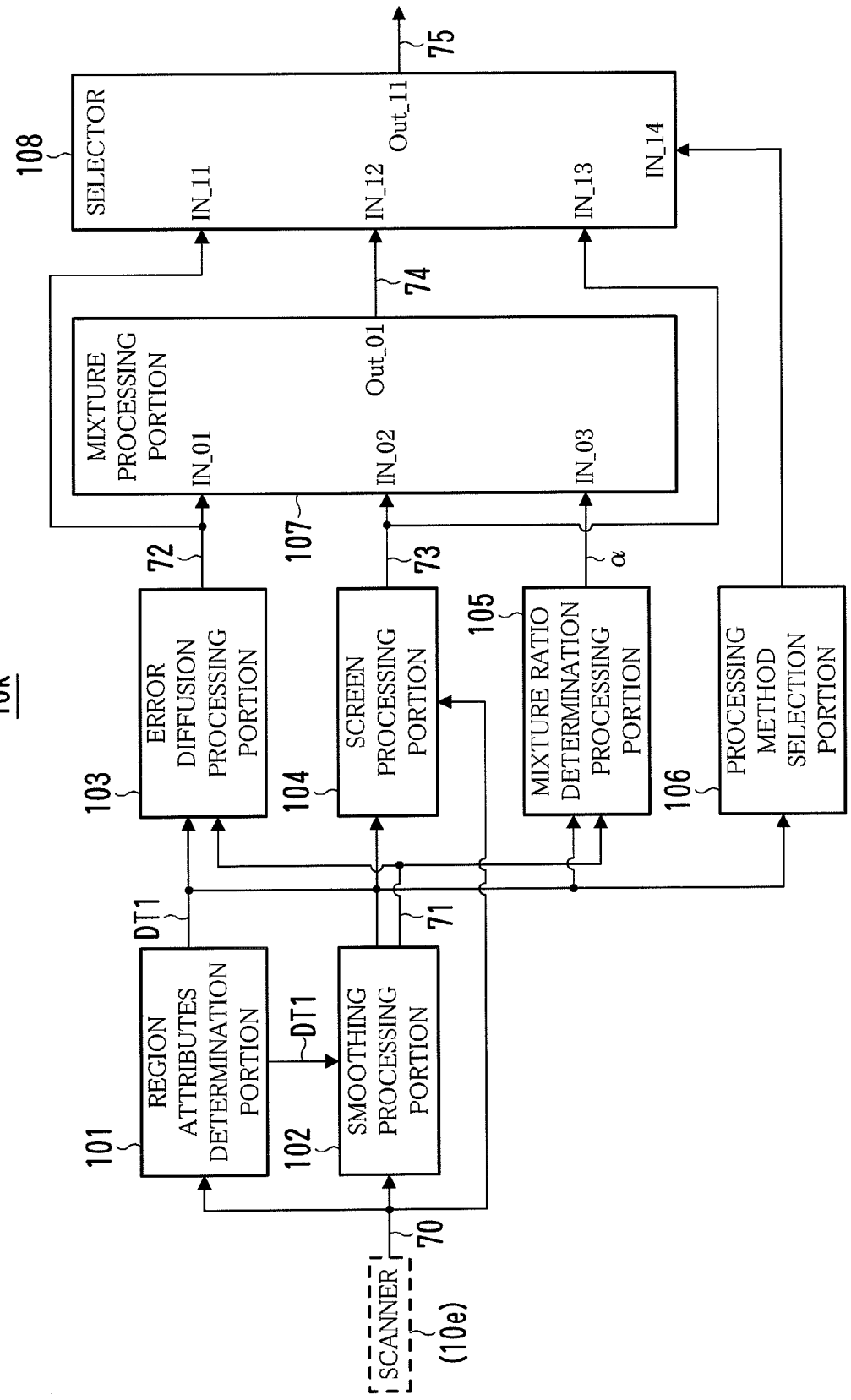
FIG. 5 shows a modified example of the configuration of an image processing portion.

FIG. 5 shows an example of the configuration of an image processing portion 10k.

The arrangement according to the second embodiment keeps non-uniform density to a minimum by matching the positions of dotted pixels between an error-diffused image and a screen-processed image as much as possible, or, in other words, by phasing the dotted pixels.

The entire configuration of the image forming apparatus 1 according to the second embodiment is substantially the same as that of the image forming apparatus 1 according to the first embodiment, which is shown in FIG. 2. Note, however, that the image forming apparatus 1 according to the second embodiment is provided with the image processing portion 10k instead of the image processing portion 10j.

Referring to FIG. 5, the image processing portion 10k according to the second embodiment is constituted by a region attributes determination portion 101, a smoothing processing portion 102, an error diffusion processing portion 103, a screen processing portion 104, a mixture ratio determination processing portion 105, a processing method selection portion 106, a mixture processing portion 107, a selector 108, and the like.

The portions of the image processing portion 10k are implemented by circuits such as an Application Specific Integrated Circuit (ASIC) or a Field Programmable Gate Array (FPGA). Alternatively, some or all of the functions of the image processing portion 10k may be implemented by causing the CPU 10a to execute software.

As with the image processing portion 10j, the image processing portion 10k uses such a configuration shown in FIG. 5 to perform a process for reducing the number of gradations of pixels in a page image. In order to perform such a process, error diffusion processing and screen processing are appropriately used in combination with each other. The following is a description of the individual portions of the image processing portion 10k shown in FIG. 5.

When the scanner 10e reads a page image depicted on paper to create image data 70 thereof, the region attributes determination portion 101 determines which attributes (type) region each pixel in the page image belongs to. In the second embodiment, the region attributes determination portion 101 determines that each pixel in the page image belongs to a character-contour-on-halftone-dots region, a character-on-halftone-dots region, a halftone dots region, a character contour region, a character region, or a continuous gradation region. Hereinafter, data indicating the result of determination by the region attributes determination portion 101 is hereinafter referred to as "region attributes data DT1".

The "character-contour-on-halftone-dots region" is a region of the contour of a character in an area where a plurality of dots are disposed regularly. The character is, for example, a symbol, a number, and a letter such as alphabet, hiragana, katakana, and Chinese character. The same applies to the descriptions hereinafter.

The "character-on-halftone-dots region" is a region enclosed by the contour of a character in an area where a plurality of dots are disposed regularly.

The "halftone dots region" is a region where a plurality of dots are disposed regularly, except for the character-contour-on-halftone-dots region and the character-on-halftone-dots region.

The "character contour region" is a region of the contour of a character disposed in an area other than the halftone dots region.

The "character region" is a region enclosed by the contour of a character disposed in an area other than the halftone dots region.

The "continuous gradation region" is a region that does not correspond to any of the character-contour-on-halftone-dots region, the character-on-halftone-dots region, the halftone dots region, the character contour region, the character region, and the continuous gradation region described above.

Known methods can be used to determine which part of a page image corresponds to which attributes region.

The smoothing processing portion 102 performs smoothing processing on a group of pixels that have been determined to be in a halftone dots region of the page image by the region attributes determination portion 101.

Hereinafter, image data 70 on the page image of which pixels have been subjected to the smoothing processing is referred to as "image data 71".

The error diffusion processing portion 103 performs error diffusion processing on image data 71. To be specific, the error diffusion processing portion 103 employs the error diffusion processing to reduce the number of density gradations in the page image indicated in the image data 71. Hereinafter, the image data 71 that has undergone the error diffusion processing is referred to as "error-diffused image data 72". The detailed descriptions of the error diffusion processing portion 103 are given later.

The screen processing portion 104 performs screen processing on image data 70. To be specific, the screen processing portion 104 performs a process for reducing the number of density gradations of the individual pixels of the page image indicated in the image data 70 and reproducing an image by using different screens composed of various shapes such as dots, lines, or mesh, depending on the density. Hereinafter, the image data 70 that has undergone the screen processing is referred to as "screen-processed image data 73". The detailed descriptions of the screen processing portion 104 are given later.

The mixture processing portion 107 performs a process for blending an error-diffused page image and a screen-processed page image. The mixture ratio for the blending process is determined by the mixture ratio determination processing portion 105 described later.

The selector 108 selects, for each attributes region in a page image, any one of the image that has undergone the error diffusion processing by the error diffusion processing portion 103, the image that has undergone the screen processing by the screen processing portion 104, and the image that has undergone the blending process by the mixture processing portion 107.

The selected images of the individual attributes regions are blended, so that an entire page image whose number of gradations is reduced is generated.

Figure 6:
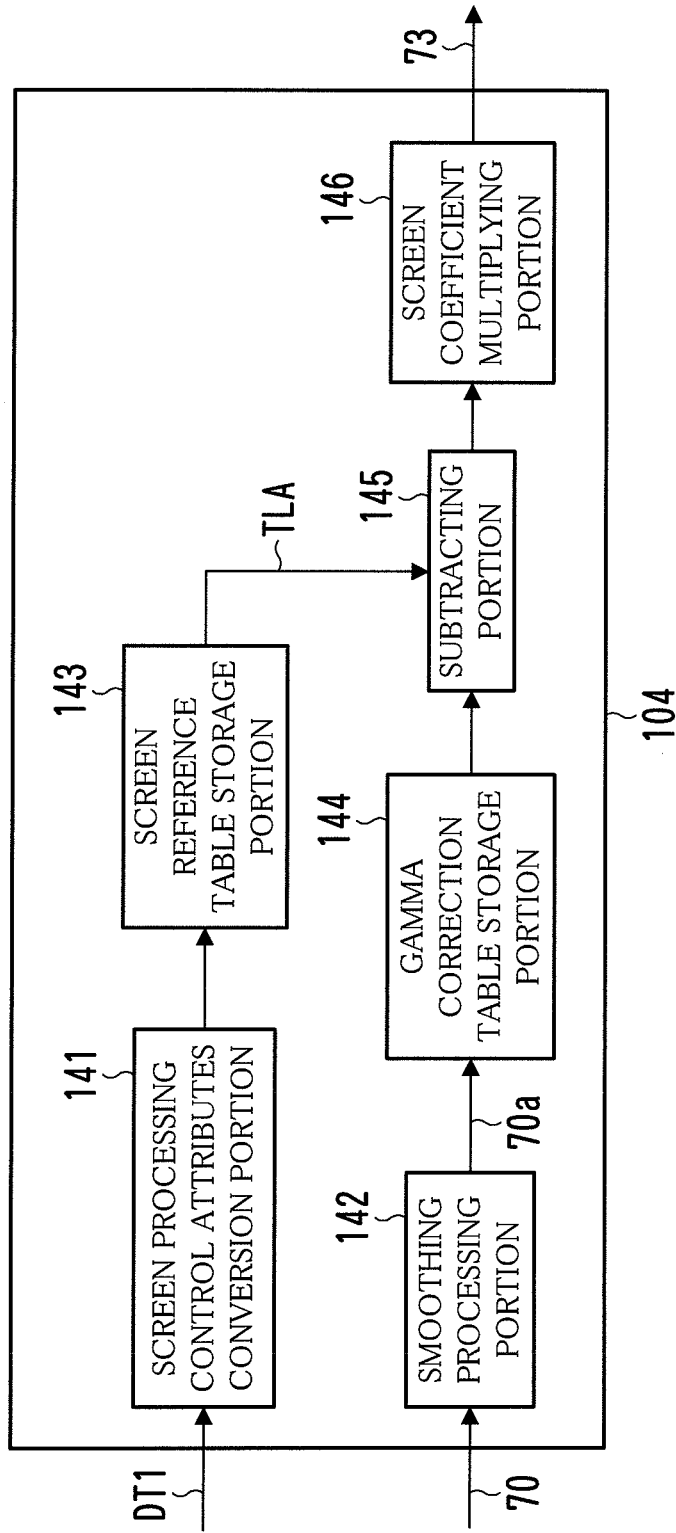
FIG. 6 shows an example of the configuration of a screen processing portion.
Figure 7:
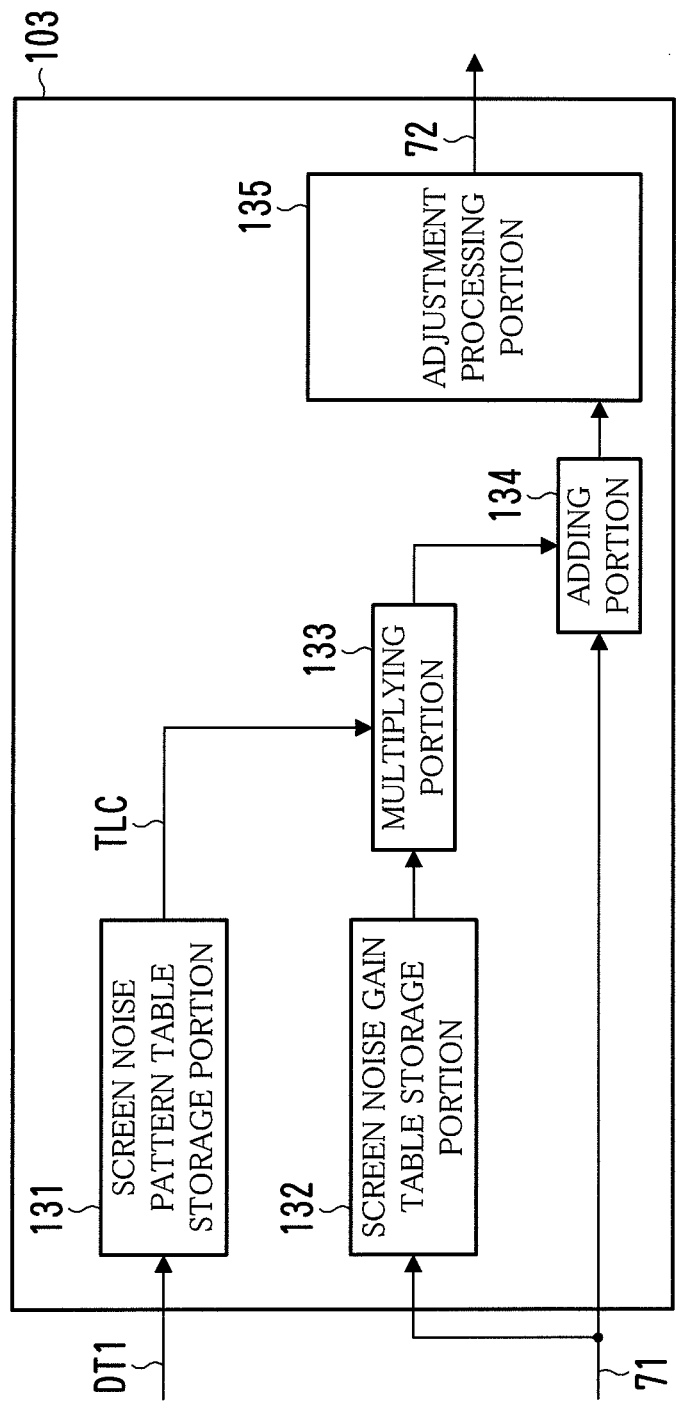
FIG. 7 shows an example of the configuration of an error diffusion processing portion.
Figure 8:
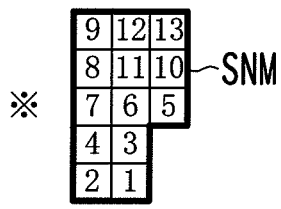
FIG. 8 shows an example of a screen noise pattern table.
Figure 9:
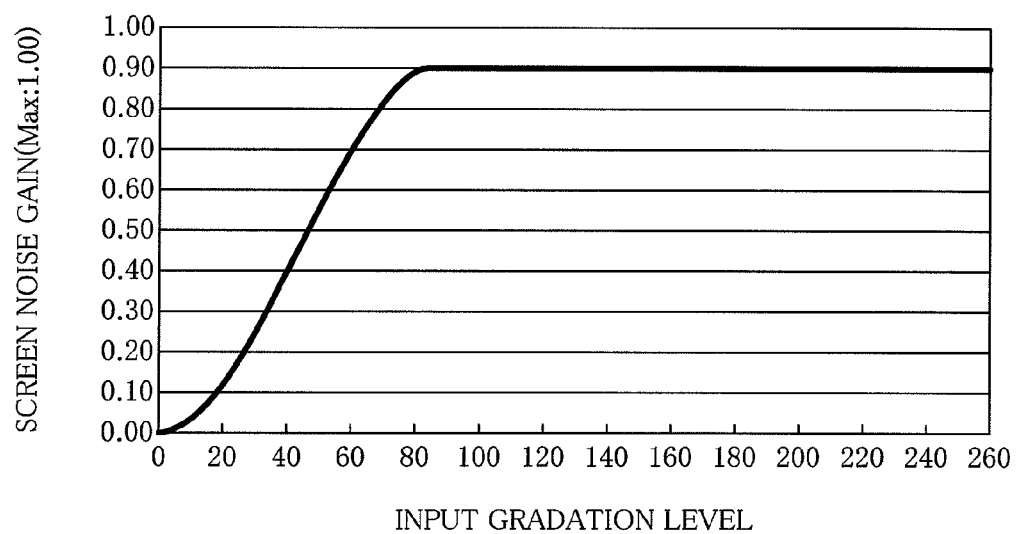
FIG. 9 shows an example of the relationship between screen noise gains and input gradation levels.
Figure 10:
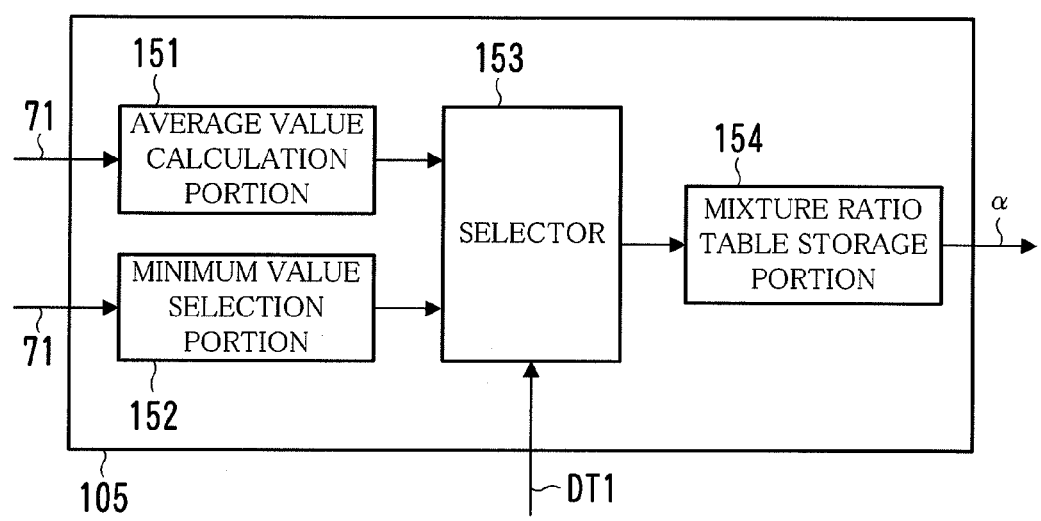
FIG. 10 shows an example of the configuration of a mixture ratio determination processing portion.
Figure 11:
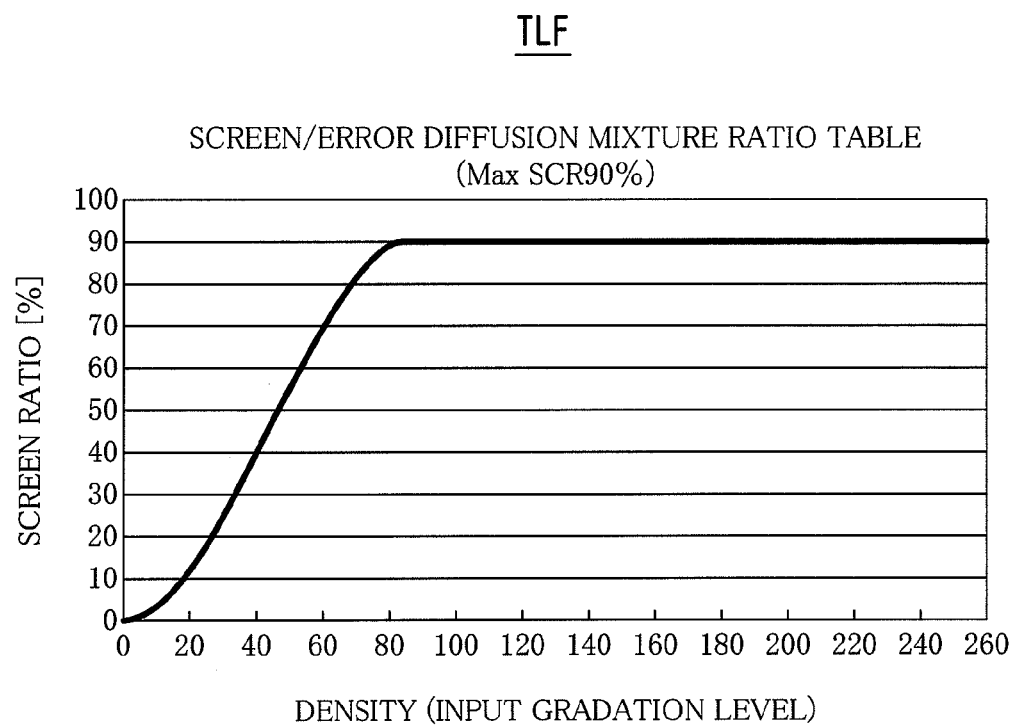
FIG. 11 shows an example of the relationship between densities and screen ratios.

FIG. 6 shows an example of the configuration of the screen processing portion 104; FIG. 7 shows an example of the configuration of the error diffusion processing portion 103; FIG. 8 shows an example of a screen noise pattern table TLC; FIG. 9 shows an example of the relationship between screen noise gains and input gradation levels; FIG. 10 shows an example of the configuration of the mixture ratio determination processing portion 105; and FIG. 11 shows an example of the relationship between densities and screen ratios.

The detailed descriptions are given below, with reference to FIGS. 6-11, of the error diffusion processing portion 103 through the selector 108 of FIG. 5.

Referring to FIG. 6, the screen processing portion 104 is constituted by a screen processing control attributes conversion portion 141, a smoothing processing portion 142, a screen reference table storage portion 143, a gamma correction table storage portion 144, a subtracting portion 145, a screen coefficient multiplying portion 146, and so on. The screen processing portion 104 performs screen processing with known methods.

The screen reference table storage portion 143 stores, therein, a plurality of screen reference tables TLA for reproducing screens. For each screen reference table TLA, the form of a screen reproduced based thereon is different. For example, for each screen reference table TLA, the start position of a line or point, screen angle, an interval between a line and a line adjacent thereto, or between a point and a point adjacent thereto, i.e., a gap therebetween, reproduced based on the subject screen reference table TLA are different.

The screen processing control attributes conversion portion 141 receives, from the region attributes determination portion 101, an input of the region attributes data DT1, to be specific, data indicating which attributes region each pixel in a page image belongs to. The region attributes data DT1 specifies the positions of a character-contour-on-halftone-dots region, a character-on-halftone-dots region, a halftone dots region, a character contour region, a character region, and a continuous gradation region.

Which screen is applied to which attributes region is determined in advance. Each of the screen reference tables TLA is associated with the number for identifying a screen represented based on the subject screen reference table TLA.

The screen processing control attributes conversion portion 141 converts the region attributes data DT1 into data indicating the number of screen reference table TLA for a screen corresponding to each attributes region in a page image.

The screen reference table storage portion 143 outputs, to the subtracting portion 145, a screen reference table TLA for each attributes region based on the post-conversion data.

To be specific, a screen reference table TLA for representing each attributes region by using a screen is selected and the selected screen reference table TLA is outputted to the subtracting portion 145.

The smoothing processing portion 142 receives an input of image data 70. When receiving an input of image data 70, the smoothing processing portion 142 performs smoothing processing on the image data 70. Thereby, image data 70a is obtained.

The gamma correction table storage portion 144 stores, therein, a gamma correction table TLB for performing gamma correction on a page image. The correction amount of each pixel in a page image is determined based on the gamma correction table TLB and the image data 70a that is inputted from the smoothing processing portion 142 or obtained by the smoothing processing portion 142, and the correction amount thus determined is outputted to the subtracting portion 145.

The subtracting portion 145 subtracts the correction amount of each pixel from the density of each pixel obtained after screen processing is performed on each attributes region in a page image based on the corresponding screen reference table TLA.

The screen coefficient multiplying portion 146 multiplies the density of each pixel in a page image calculated by the subtracting portion 145 by a screen multiplying coefficient. The densities of the individual pixels in a page image are adjusted in this manner, so that screen-processed image data 73 is obtained.

Referring to FIG. 7, the error diffusion processing portion 103 is constituted by a screen noise pattern table storage portion 131, a screen noise gain table storage portion 132, a multiplying portion 133, an adding portion 134, an adjustment processing portion 135, and so on.

The error diffusion processing portion 103 receives an input of region attributes data DT1 from the region attributes determination portion 101, and receives an input of image data 71 from the smoothing processing portion 102.

The screen noise pattern table storage portion 131 stores, therein, a plurality of screen noise pattern tables TLC used for generating screen noise. The "screen noise" is noise to be added to image data, and is a set of pixels disposed regularly. The detailed descriptions of the screen noise are provided in Japanese Patent No. 4107108.

For each screen noise pattern table TLC, the form of screen noise reproduced based thereon is different.

For example, when the screen noise pattern table TLC shows a matrix as shown in FIG. 8 in which a plurality of identical sub-matrixes SNM are disposed regularly, the start position of a line or point, screen angle, a gap between a component (pixel) in a sub-matrix SNM and the same component (pixel) in the adjacent sub-matrix SNM reproduced based on the screen noise are different for each screen noise pattern table TLC.

With respect to each of the screen noise pattern tables TLC, the screen reference table storage portion 143 stores, therein, a screen reference table TLA which is to make a pair with the subject screen noise pattern pattern table TLC. Such a screen reference table TLA which is to make a pair is the screen reference table TLA in which all of the start position of a line or point, screen angle, and a gap are common to those of the subject screen noise pattern table TLC.

Stated differently, a pair of the screen reference table TLA and the screen noise pattern table TLC provides a common form. In short, the screen form represented based on the screen reference table TLA and the screen noise pattern form represented based on the screen noise pattern table TLC are substantially equal to each other.

The screen noise gain table storage portion 132 stores, therein, a screen noise gain table TLD which indicates the relationship between screen noise gains and input gradation levels as shown in FIG. 9.

When image data 70 and region attributes data DT1 are fed into the error diffusion processing portion 103, the screen noise pattern table storage portion 131 and the screen noise gain table storage portion 132 output data as discussed below to the multiplying portion 133.

To be specific, what is outputted from the screen noise pattern table storage portion 131 to the multiplying portion 133 is a screen noise pattern table TLC corresponding to each attributes region indicated in the region attributes data DT1 among the screen noise pattern tables TLC stored in the screen noise pattern table storage portion 131.

Further, what is outputted from the screen noise gain table storage portion 132 to the multiplying portion 133 is a screen noise gain that corresponds to the density (input gradation) for each attributes region in a page image and is contained in the screen noise gain table TLD.

The multiplying portion 133 performs the following calculation process for each attributes region in a page image.

The multiplying portion 133 multiplies each density value of an image of the region shown in the inputted screen noise pattern table TLC by the inputted screen noise gain.

The inputted screen noise pattern table TLC is a table paired with the screen reference table TLA used in the screen processing performed on that region by the screen processing portion 104.

The values of components (pixels) constituting the sub-matrixes SNM of the screen noise pattern table TLC are as follows. It is supposed that the maximum value of density, i.e., the number of gradations, is "Cmax", and the values of the components of the sub-matrixes SNM are arranged in ascending order. In such a case, the minimum value is approximately $Cmax \times (-\frac{1}{2})$, the maximum value is approximately $Cmax \times (\frac{1}{2})$, and the other values are arranged between the minimum value and the maximum value at substantially regular intervals. In the case of 4096 gradations, for example, the other values are arranged between the value of −2048 and the value of 2047. Further, the average value of all the components is substantially zero.

The adding portion 134 adds the density value of each pixel obtained by the multiplying portion 133 to the density value of each pixel indicated in image data 71. Stated differently, the adding portion 134 adds a screen noise obtained as a result of the adjustment based on the screen noise gain to a page image. Known methods such as that described in Japanese Laid-open Patent Publication No. 10-032712 are used to add a screen noise.

The adjustment processing portion 135 performs error attenuation processing, integral filtering processing, smoothing processing, or dot thinning processing on data indicating the density of each pixel obtained by the adding portion 134. Thus, screen-processed image data 73 is created.

Referring back to FIG. 5, the mixture ratio determination processing portion 105 determines the mixture ratio of a page image that has undergone the error diffusion processing by the error diffusion processing portion 103 and a page image that has undergone the screen processing by the screen processing portion 104, in the following manner.

The mixture ratio determination processing portion 105 receives an input of region attributes data DT1 from the region attributes determination portion 101, and receives an input of image data 71 from the smoothing processing portion 102.

Referring to FIG. 10, the mixture ratio determination processing portion 105 is constituted by an average value calculation portion 151, a minimum value selection portion 152, a selector 153, a mixture ratio table storage portion 154, and so on.

The average value calculation portion 151 selects, as a pixel of interest, each pixel in a page image. Subsequently, the average value calculation portion 151 calculates, based on the image data 71, the average value of the densities of the individual pixels in an area of M×N centered on the pixel of interest. For example, when M and N represent "3" and "5" respectively, the average value calculation portion 151 calculates the average value of the densities of 15 pixels in an area of 3×5 centered on the pixel of interest.

The minimum value selection portion 152 selects, as a pixel of interest, each pixel in a page image. Subsequently, the minimum value selection portion 152 calculates, based on the image data 71, the minimum value of the densities of the individual pixels in an area of M×N centered on the pixel of interest.

The selector 153 selects, for each pixel in a page image, any one of the average value calculated by the average value calculation portion 151 and the minimum value calculated by the minimum value selection portion 152 in the following manner.

As for a pixel in a continuous gradation region or a character region, the selector 153 selects the average value calculated by the average value calculation portion 151. On the other hand, as for a pixel in a character contour region, a halftone dots region, a character-contour-on-halftone-dots region, or a character-on-halftone-dots region, the selector 153 selects the minimum value calculated by the minimum value selection portion 152.

The mixture ratio table storage portion 154 stores, therein, a mixture ratio table TLF showing the relationship between densities and screen ratios shown in FIG. 11.

The mixture ratio table storage portion 154 outputs, to the mixture processing portion 107, a screen ratio corresponding to the average value or the minimum value selected by the selector 153 for each pixel in a page image.

Referring back to FIG. 5, the mixture processing portion 107 receives an input of error-diffused image data 72 from the error diffusion processing portion 103, and an input of screen-processed image data 73 from the screen processing portion 104.

The mixture processing portion 107 performs a process for blending a screen-processed page image and an error-diffused page image based on the screen ratio determined by the mixture ratio determination processing portion 105. A method for the blending process is the same as that of the first embodiment. To be specific, the mixture processing portion 107 calculates the densities of the individual pixels in the page image by using equation (1) discussed earlier, and creates mixture image data 74 indicating the densities of the individual pixels.

The processing method selection portion 106 selects, for each attributes region in a page image, any one of the screen processing, the error diffusion processing, and the mixture processing in the following manner. For example, as for a continuous gradation region and a halftone dots region, the processing method selection portion 106 selects the mixture processing. As for a character contour region, a character region, a character-contour-on-halftone-dots region, and a character-on-halftone-dots region, the processing method selection portion 106 selects the error diffusion processing. The selection result is outputted to the selector 108.

The selector 108 also receives an input of error-diffused image data 72 from the error diffusion processing portion 103, an input of screen-processed image data 73 from the screen processing portion 104, and an input of mixture image data 74 from the mixture processing portion 107.

The selector 108 selects the densities of the individual pixels in a page image in the following manner. As for a pixel in an attributes region for which the screen processing is selected by the processing method selection portion 106, the selector 108 selects the density indicated in the screen-processed image data 73 of the pixel. As for a pixel in an attributes region for which the error diffusion processing is selected by the processing method selection portion 106, the selector 108 selects the density indicated in the error-diffused image data 72 of the pixel. As for a pixel in an attributes region for which the mixture processing is selected by the processing method selection portion 106, the selector 108 selects the density indicated in the mixture image data 74 of the pixel.

Then, output image data 75 is created which indicates the densities of the individual pixels in a page image selected by the selector 108, and the created output image data 75 is outputted to the printing unit 10f, and so on.

The output image data 75 created in this manner is image data of a page image in which the number of gradations is reduced.

Figure 12A:
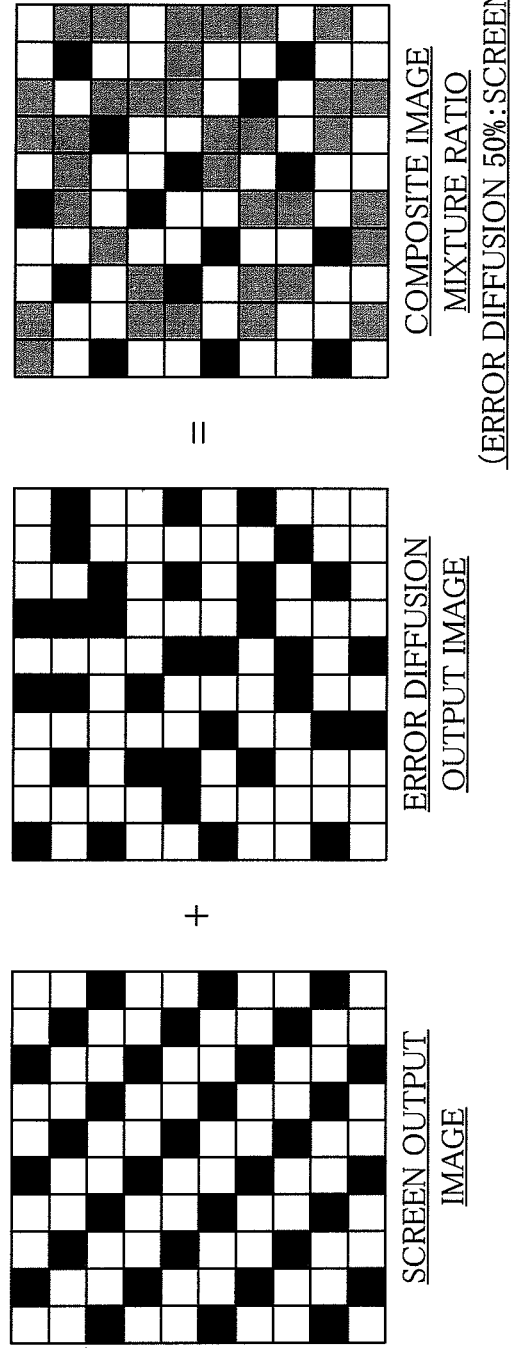
FIG. 12A shows an example of the result of mixing by using a conventional method.
Figure 12B:
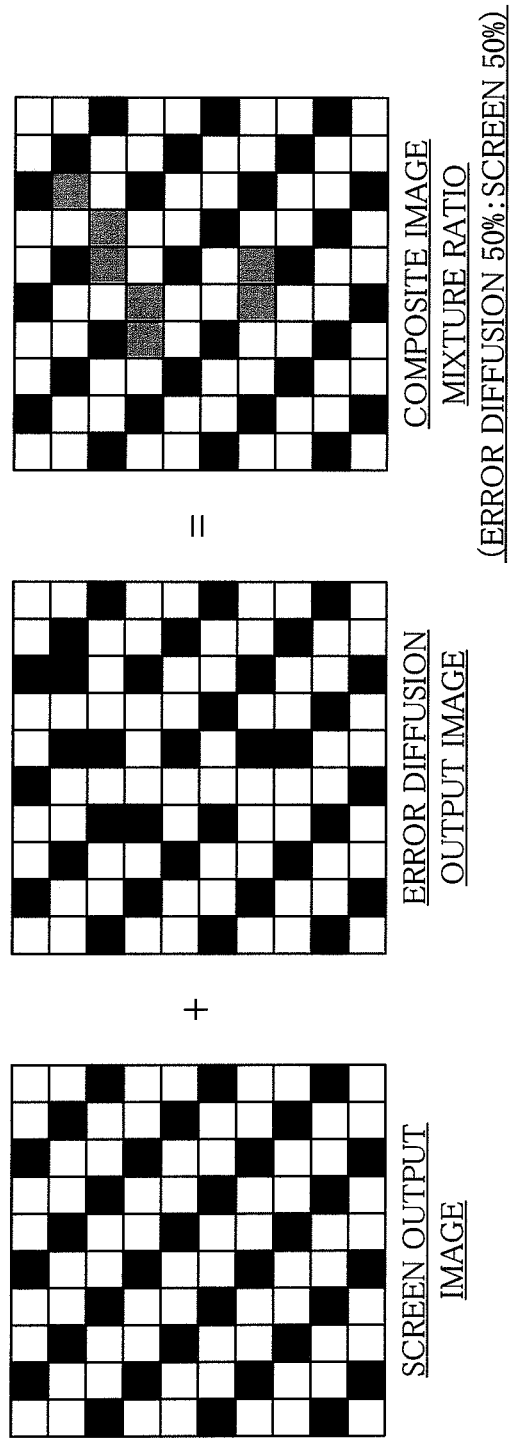
FIG. 12B shows an example of the result of mixing according to a second embodiment.

FIG. 12A shows an example of the result of mixing by using a conventional method, and FIG. 12B shows an example of the result of mixing according to the second embodiment.

In the first and second embodiments, a page image that has subjected to halftone processing by using error diffusion processing and a page image that has subjected to halftone processing by using screen processing are blended together at a ratio depending on the density of each pixel. The arrangement of first and second embodiments, thus, makes discontinuity of images around the boundary therebetween less apparent as compared to conventional techniques.

In the second embodiment, screen processing and error diffusion processing are performed on an identical region by using a pair of a screen reference table TLA and a screen noise pattern table TLC that can reproduce a common form. This makes it possible to match the phase of dotted pixels, which can obtain a low-gradation image with non-uniform density kept to a minimum.

As shown in FIG. 12A, non-uniform density have conventionally appeared often in a blended (combined) page image. However, the arrangement according to the second embodiment enables such non-uniform density to be kept to a minimum, as shown in FIG. 12B.

In the second embodiment, screen processing and error diffusion processing are performed on an identical region by using a screen reference table TLA and a screen noise pattern table TLC that are equal to each other in gap between neighboring lines or points. Instead, however, it is possible to use a screen reference table TLA and a screen noise pattern table TLC that have a gap ratio of 1:N or N:1 where N is a natural number equal to or greater than 2.

In the second embodiment, a screen noise gain table TLD shows the relationship between screen noise gains and input gradations as shown in FIG. 9. Instead, however, the screen noise gain table TLD may show the relationship between screen noise gains and screen ratios. In such a case, the screen noise gain table TLD preferably shows the relationship in such a manner that the higher the screen ratio becomes, the higher the screen noise gain becomes. The error diffusion processing portion 103 receives an input of a screen ratio ($\alpha$ %) determined by the mixture ratio determination processing portion 105.

According to the first and second embodiments, processing for reducing the number of gradations is performed on an image obtained by the scanner 10e. It is possible to perform such a process also on an image taken by a digital camera. It is also possible to perform such a process on an image transmitted from the personal computer 2.

In the first and second embodiments, an image whose number of gradations is reduced with error diffusion processing is integrated appropriately with an image whose number of gradations is reduced with screen processing. Instead, however, another method is used to integrate images in each of which the number of gradations is reduced. Another arrangement is possible in which three or more methods are used to integrate three images in each of which the number of gradations is reduced.

The configuration, processing content, processing procedures, table structure and the like of all or individual portions of the image forming apparatus 1 can be appropriately modified in keeping with the spirit of the invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing apparatus comprising:
a first generation portion that generates a first low-gradation image by performing a first process on an input image to reduce the number of gradations of the input image;
a second generation portion that generates a second low-gradation image by performing a second process on the input image to reduce the number of gradations of the input image;
a density detector that detects a density of the input image;
a determination portion that determines, based on the density, a ratio at which the first low-gradation image and the second low-gradation image are blended together;
a mixing portion that blends the first low-gradation image and the second low-gradation image in accordance with the ratio; and
a line-appearance-frequency detector that detects a frequency indicating how often a line constituted by a plurality of dots continuously disposed appears, or, indicating how often a line constituted by a plurality of dots regularly and intermittently disposed appears, wherein the determination portion determines the ratio in such a manner that the higher the frequency is, the higher the ratio becomes.

2. The image processing apparatus according to claim 1, wherein
the first generation portion generates the first low-gradation image by performing screen processing as the first process,
the second generation portion generates the second low-gradation image by performing error diffusion processing as the second process, and
the determination portion determines the ratio in such a manner that the higher the density is, the higher the ratio becomes.

3. An image processing apparatus comprising:
a first generation portion that generates a first low-gradation image by performing screen processing on an input image to reduce the number of gradations of the input image;
a second generation portion that generates a second low-gradation image by performing error diffusion processing on the input image to reduce the number of gradations of the input image,
a density detector that detects a density of the input image;
a determination portion that determines, based on the density, a ratio at which the first low-gradation image and the second low-gradation image are blended together, wherein the ratio is determined in such a manner that the higher the density is, the higher the ratio becomes; and
a mixing portion that blends the first low-gradation image and the second low-gradation image in accordance with the ratio,
wherein the second generation portion performs the error diffusion processing by adding a screen noise to a predetermined region in the input image in accordance with the ratio, the screen noise having a pattern close to a pattern of a first screen that is used in the screen processing performed on the predetermined region by the first generation portion.

4. An image processing apparatus comprising:
a first generation portion that generates a first low-gradation image by performing a first process on an input image to reduce the number of gradations of the input image;
a second generation portion that generates a second low-gradation image by performing a second process on the input image to reduce the number of gradations of the input image;
a density detector that detects, as a density of the input image, for each pixel of the input image, any one of the following:
an average value of densities of pixels in a prescribed range centered on said each pixel;
a minimum value of the densities of the pixels in the prescribed range; and
a content of a black image obtained by performing binarization process on the pixels in the prescribed range;
a determination portion that determines, based on the density, a ratio at which the first low-gradation image and the second low-gradation image are blended together for said each pixel of the input image;
a mixing portion that blends the first low-gradation image and the second low-gradation image in accordance with the ratio of said each pixel of the input image.

5. The image processing apparatus according to claim 4, wherein the density detector detects, as the density, any one of the average value and the minimum value in accordance with attributes of the input image.

6. A method for reducing a gradation level of an image, comprising:
a first step of generating a first low-gradation image by performing a screen processing on an input image to reduce the number of gradations of the input image;
a second step of generating a second low-gradation image by performing an error diffusion processing on the input image to reduce the number of gradations of the input image,
a third step of detecting a density of the input image;
a fourth step of determining, based on the density, a ratio at which the first low-gradation image and the second low-gradation image are blended together, wherein the ratio is determined in such a manner that the higher the density is, the higher the ratio becomes; and
a fifth step of blending the first low-gradation image and the second low-gradation image in accordance with the ratio,
wherein the second process is a process for adding a screen noise to a predetermined region in the input image in accordance with the ratio, the screen noise having a pattern close to a pattern of a first screen that is used in the first process on the predetermined region.

7. A method for reducing a gradation level of an image, comprising:
a first step of generating a first low-gradation image by performing a first process on an input image to reduce the number of gradations of the input image;
a second step of generating a second low-gradation image by performing a second process on the input image to reduce the number of gradations of the input image;
a third step of detecting a density of the input image;
a fourth step of determining, based on the density, a ratio at which the first low-gradation image and the second low-gradation image are blended together, wherein the ratio is determined in such a manner that the higher the frequency is, the higher the ratio becomes;

a fifth step of blending the first low-gradation image and the second low-gradation image in accordance with the ratio; and a sixth step of detecting a frequency indicating how often a line constituted by a plurality of dots continuously disposed appears, or, indicating how often a line constituted by a plurality of dots regularly and intermittently disposed appears.

8. The method according to claim 7, wherein
the first process is screen processing,
the second process is error diffusion processing, and
the fourth step includes determining the ratio in such a manner that the higher the density is, the higher the ratio becomes.

9. A method for reducing a gradation level of an image, comprising:

a first step of generating a first low-gradation image by performing a first process on an input image to reduce the number of gradations of the input image;

a second step of generating a second low-gradation image by performing a second process on the input image to reduce the number of gradations of the input image;

a third step of detecting as a density, for each pixel of the input image, any one of the following:

an average value of densities of pixels in a prescribed range centered on said each pixel;

a minimum value of the densities of the pixels in the prescribed range; and a content of a black image obtained by performing binarization process on the pixels in the prescribed range;

a fourth step of determining, based on the density, a ratio at which the first low-gradation image and the second low-gradation image are blended together for said each pixel of the input image; and a fifth step of blending the first low-gradation image and the second low-gradation image in accordance with the ratio of said each pixel of the input image.

10. The method according to claim 9, wherein the third step includes detecting, as the density, any one of the average value and the minimum value in accordance with attributes of the input image.

* * * * *